United States Patent
Delaney et al.

(10) Patent No.: US 10,817,321 B2
(45) Date of Patent: Oct. 27, 2020

(54) HARDWARE INDEPENDENT INTERFACE FOR COGNITIVE DATA MIGRATION

(71) Applicant: International Business Machines Corporation, Armonk, NY (US)

(72) Inventors: John V. Delaney, Kildalkey (IE); Florian D. Graf, Zurich (CH); Anthony M. Hunt, Hopewell Junction, NY (US); Ricky L. Montagna, Briarcliff, TX (US); Pawel J. Wieczorek, Mikolow (PL); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 15/464,632

(22) Filed: Mar. 21, 2017

(65) Prior Publication Data

US 2018/0276018 A1 Sep. 27, 2018

(51) Int. Cl.
G06F 9/455 (2018.01)
G06F 8/61 (2018.01)
G06F 9/445 (2018.01)

(52) U.S. Cl.
CPC ............ *G06F 9/45558* (2013.01); *G06F 8/63* (2013.01); *G06F 9/44526* (2013.01); *G06F 2009/4557* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,484,208 B1* | 1/2009 | Nelson | ................. | G06F 9/45558 718/1 |
| 7,761,573 B2* | 7/2010 | Travostino | ............ | G06F 9/4856 709/226 |
| 7,831,761 B2* | 11/2010 | Phelan | ................. | G06F 9/45558 710/38 |
| 7,941,813 B1* | 5/2011 | Protassov | ............. | G06F 9/4411 710/33 |
| 8,065,677 B2* | 11/2011 | Sen | ........................ | G06F 9/5077 718/1 |
| 8,255,538 B1 | 8/2012 | Lam et al. | | |
| 8,972,405 B1* | 3/2015 | Chaulk | ................. | G06F 16/182 707/737 |

(Continued)

OTHER PUBLICATIONS

"Dynamic operating system kernel architecture evolution depending on application constraints," IP.com Prior Art Database Technical Disclosure No. IPCOM000222441D, Oct. 3, 2012, 5 pages.

(Continued)

*Primary Examiner* — Hiren P Patel
(74) *Attorney, Agent, or Firm* — Yee & Associates, P.C.

(57) ABSTRACT

A method for off-board data migration. Responsive to receiving a request to migrate a virtual machine image, a memory location of the source virtual machine is identified. Using a generalized pathing interface, a range of logical blocks is accessed for both the source and destination virtual machines. The memory location of the source virtual machine is copied to a memory location of the destination virtual machine. The destination virtual machine is started, and; and the source virtual machine is stopped.

15 Claims, 7 Drawing Sheets

(56) References Cited

U.S. PATENT DOCUMENTS

| | | | |
|---|---|---|---|
| 9,152,447 B2* | 10/2015 | Venkat | G06F 9/45541 |
| 9,460,028 B1* | 10/2016 | Raizen | G06F 11/00 |
| 9,602,341 B1* | 3/2017 | Degwekar | G06F 9/45558 |
| 9,882,805 B2* | 1/2018 | Thankappan | H04L 45/125 |
| 9,891,943 B2* | 2/2018 | Brenneman | H04L 41/0813 |
| 9,933,957 B1* | 4/2018 | Cohen | G06F 3/0647 |
| 10,133,593 B1* | 11/2018 | Sethuramalingam | G06F 9/45558 |
| 10,282,821 B1* | 5/2019 | Warren | G06T 5/002 |
| 10,353,603 B1* | 7/2019 | Baruch | G06F 3/0689 |
| 2008/0270564 A1* | 10/2008 | Rangegowda | G06F 9/5088 709/212 |
| 2009/0119685 A1* | 5/2009 | Phelan | G06F 9/45558 719/324 |
| 2010/0138827 A1* | 6/2010 | Frank | G06F 9/45558 718/1 |
| 2010/0228934 A1* | 9/2010 | Chandrasekaran | G06F 9/45558 711/162 |
| 2011/0197039 A1* | 8/2011 | Green | G06F 3/0617 711/162 |
| 2011/0231698 A1 | 9/2011 | Zlati et al. | |
| 2013/0054890 A1* | 2/2013 | Desai | G06F 3/0688 711/114 |
| 2013/0198468 A1* | 8/2013 | Antony | G06F 11/3442 711/162 |
| 2013/0275708 A1* | 10/2013 | Doi | H04L 63/1425 711/165 |
| 2013/0298125 A1* | 11/2013 | Hutchins | G06F 16/16 718/1 |
| 2014/0095816 A1* | 4/2014 | Hsu | G06F 3/0655 711/162 |
| 2014/0229638 A1* | 8/2014 | Zhou | G06F 3/061 710/38 |
| 2014/0297941 A1* | 10/2014 | Rajani | G06F 3/0644 711/114 |
| 2014/0366155 A1* | 12/2014 | Chang | H04L 67/1097 726/27 |
| 2015/0039717 A1* | 2/2015 | Chiu | H04L 67/2842 709/214 |
| 2015/0074056 A1 | 3/2015 | Kellner et al. | |
| 2015/0095445 A1* | 4/2015 | Thankappan | H04L 45/125 709/214 |
| 2015/0163120 A1* | 6/2015 | Chinnaiah Sankaran | H04L 43/0888 709/224 |
| 2015/0317098 A1 | 11/2015 | Kao et al. | |
| 2015/0324216 A1* | 11/2015 | Sizemore | G06F 9/45558 718/1 |
| 2015/0378759 A1* | 12/2015 | Pershin | G06F 9/45558 718/1 |
| 2015/0378785 A1* | 12/2015 | Tarasuk-Levin | G06F 9/4881 718/1 |
| 2016/0034303 A1* | 2/2016 | Aslam | G06F 12/0806 711/124 |
| 2016/0085772 A1* | 3/2016 | Vermeulen | G06F 16/21 707/615 |
| 2016/0188353 A1* | 6/2016 | Shu | G06F 9/45558 718/1 |
| 2016/0335108 A1* | 11/2016 | Ryu | G06F 9/45558 |
| 2017/0093923 A1* | 3/2017 | Duan | H04L 63/1408 |
| 2018/0060349 A1* | 3/2018 | Wilmer | G06F 11/1004 |
| 2019/0102215 A1* | 4/2019 | Sethuramalingam | G06F 9/45558 |
| 2019/0391839 A1* | 12/2019 | Ryu | G06F 9/45558 |

OTHER PUBLICATIONS

"Extended Copy command," Working Draft SCSI, T10 Technical Committee, T10/99-143r1, Apr. 2, 1999, 34 pages. www.t10.org/ftp/t10/document.99/99-143r1.pdf.

"Framework to Facilitate Data Storage Migration Based on Usage Profiles," IP.com Prior Art Database Technical Disclosure No. IPCOM000207300D, May 25, 2011, 3 pages.

"Storage Architecture," vSphere 5 Documentation Center, VMware, Inc., Sep. 27, 2016, 2 pages. https://pubs.vmware.com/vsphere-50/index.jsp?topic=%2Fcom.vmware.vsphere.introduction.doc_50%2FGUID-2E7DB290-2A07-4F54-9199-B68FCB210BBA.html.

"What is Pluggable Storage Architecture (PSA) and Native Multipathing (NMP)?", VMware Knowledge Base, VMware, Inc., Mar. 19, 2013, 3 pages. https://kb.vmware.com/selfservice/microsites/search.do?language=en_US&cmd=displayKC&externalId=1011375.

"Zero downtime (SAN) Data Migration," Cirrus Data Solutions, Inc., Whitepaper, Jan. 2014, 8 pages. www.itrenewals.com/wp-content/uploads/2014/01/DMS-Whitepaper-Dec-20.docx.

Hogan, "Pluggable Storage Architecture (PSA) Deep-Dive—Part 1," Feb. 4, 2013, 9 pages. http://cormachogan.com/2013/02/04/pluggable-storage-architecture-psa-deep-dive-part-1/.

Hogan, "VMware vSphere® Storage APIs—Array Integration (VAAI)," Technical Marketing Documentation V. 1.1, VMware, Inc., Dec. 2012, 19 pages. http://www.vmware.com/files/pdf/techpaper/VMware-vSphere-Storage-API-Array-Integration.pdf.

Hohenauer et al., "IBM DS8870 and VMware Synergy," International Technical Support Organization, IBM Corporation, Aug. 2013, 66 pages.

\* cited by examiner

HARDWARE INDEPENDENT INTERFACE FOR COGNITIVE DATA MIGRATION

BACKGROUND

1. Field

The present invention relates generally to data migration in a computing storage environment, and more particularly, to off-board data migration at the image level across disparate systems in a computing storage environment.

2. Description of the Related Art

Virtualization technology is transforming business. Companies are increasingly virtualizing their environments to reduce costs and meet goals such as server consolidation, centralization of services and management, disaster recovery implementation, provisioning of remote or thin client desktops, and cloud creation for optimized resource use. Organizations often deploy server virtualization to gain economies of scale by consolidating under-used resources to a new platform.

Server virtualization is transforming the concept of storage itself. The idea of utilized storage no longer depends on either the physical platter or the logical unit (LUN) within the storage area network (SAN). Instead, storage utilization in a virtualized server depends on how the operating system allocates the data utilized by the virtual machine. Virtual machines are assigned abstracted storage space of a storage model, while also being insulated from the complexity of the underlying physical storage technology.

Datacenters often need to migrate a subset of the operating systems located on the LUN, without migrating the entire LUN. However, in a virtualized environment, on-board storage operations performed by a host system, such as migration, cloning and snapshots, traditionally have been expensive from a resource perspective. When utilizing on-board migration tooling, many steps have to be taken, like loading the software and determining the data disks to migrate. This requires administrative time. Furthermore, while on-board migration can be performed for individual virtual machines, i.e., image-to-image migration, transferring data by on-board migration is limited by the bandwidth of the network interface cards, the local area network, and the wide area network. This means that on-board data replication takes a long time when compared to off-board migration, which moves from the SAN then over the wide area network (WAN), bypassing the network interface card (NIC) and local area network (LAN) completely.

Higher end storage units have intelligent controllers that provide off-board storage services beyond just RAID. They include storage services to mirror LUNs from one storage unit to another local unit or to one that is at a remote data center. Functions such as migration, cloning and snapshots can be performed more efficiently by the storage device than by the host. Since off-board migration is much faster than on-board migration, off-board migration can speed the time required to migrate images. Further, off-board migration is more distance tolerant than on-board migration allowing for greater wide area network utilization.

Currently, off-board methods exist to migrate data from an image utilizing migration software or commands from supported operating systems that link via API to a supported, attached disk operating system. However, off-board data migration tooling across disparate systems can migrate data at the LUN level, not at the image level. This limits the amount of migration activity that can be done utilizing disk-to-disk migration (off-board) vs. image migration (on-board).

For example, an AIX machine can migrate data to a connected EMC device running Symmetrix Remote Data Facility (SRDF) at the LUN level, but not at the image level. Likewise, an EMC device can migrate data to an attached SAN migration appliance at the LUN level, but not at the image level.

SUMMARY

According to an embodiment of the present invention, a computer-implemented method is provided for verifying event information to be shared by a mobile apparatus. The mobile apparatus communicates with a nearby mobile or immobile apparatus to generate a verification in response to encountering with the nearby mobile or immobile apparatus. The mobile apparatus verifies an existence of an incident event in response to arriving at a place of the incident event. The mobile apparatus publishes a verified incident event in order to add into an incident event distributed ledger that is used for managing event information related to the incident event.]

According to an embodiment of the present invention there is provided a method executed by an information verifier for verifying event information to be shared among a plurality of mobile apparatus. The method includes receiving an event notification issued from an information provider of the plurality of the mobile apparatus. The method also includes verifying one or more event notifications relating to an incident event. The method further includes creating a verified event block that constitutes an event management distributed ledger associated with an account, in which the account is used for collecting reward from one or more information subscribers of the plurality of the mobile apparatus. In the method, a least part of the reward collected into the account is distributed to the information verifier in response to clearance of the incident event.

According to another embodiment of the present invention there is provided a method executed by an information provider for providing event information to be shared among a plurality of mobile apparatus, in which the information provider is one of the pluralities of the mobile apparatus. The method includes issuing an event notification for verification through a network in response to detecting a local event. The method also includes receiving a reference request for event information about the local event from an information subscriber of the plurality of the mobile apparatus. The method further includes confirming whether or not reward has been remitted from the information subscriber to an account, in which the account is associated with an event management distributed ledger for the local event. The method includes further providing an event content of the event notification to the information subscriber in response to confirming that the reward has been remitted to the account.

Further according to another embodiment of the present invention there is provided a mobile apparatus for sharing event information, in which the mobile apparatus includes a memory tangibly storing program instructions; and a processor in communications with the memory. By executing the program instructions, the processor is configured to select a remote incident event of interest, in which the remote incident event is associated with a first event management distributed ledger and a first account. The processor is also configured to pay reward for provision of event information about the remote incident event to the first account. The processor is further configured to send a first reference request to a first other mobile apparatus, in which the first other mobile apparatus is recorded in an existing verified event block of the first event management distributed ledger. Further the processer is configured to receive event content relating to the remote incident event from the first other mobile apparatus.

According to another embodiment of the present invention there is provided a computer system for verifying event information to be shared among a plurality of mobile apparatus, in which the computer system includes a memory tangibly storing program instructions; and a processor in communications with the memory. By executing the program instructions, the processor is configured to receive an event notification issued from an information provider of the plurality of the mobile apparatus. The processor is also configured to verify one or more event notifications relating to an incident event. The processor is further configured to create a verified event block that constitutes an event management distributed ledger associated with an account, in which the account is used for collecting reward from one or more information subscribers of the plurality of the mobile apparatus. A least part of the reward collected into the account is distributed to the computer system in response to clearance of the incident event.

According to further another embodiment of the present invention there is provided a computer program product for sharing event information, in which the computer program product includes a computer readable storage medium having program instructions embodied therewith. The program instructions are executable by a computing node to cause the computing node to issue a detected event notification for verification through a network in response to detecting a local event. The program instructions are also executable to cause the computing node to provide an event content of requested event notification after confirming that reward for provision of event information to a first account has been remitted, in which the first account is associated with a first event management distributed ledger. The program instructions are executable to cause the computing node further to send a reference request to an issuer of a verified event notification recorded in a second event management distributed ledger for managing a target incident event after paying reward to a second account associated with the second event management distributed ledger.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-7, diagrams of data processing environments are provided in which illustrative embodiments may be implemented. It should be appreciated that FIGS. 1-7 are only meant as examples and are not intended to assert or imply any limitation with regard to the environments in which different embodiments may be implemented. Many modifications to the depicted environments may be made.

Figure 1:
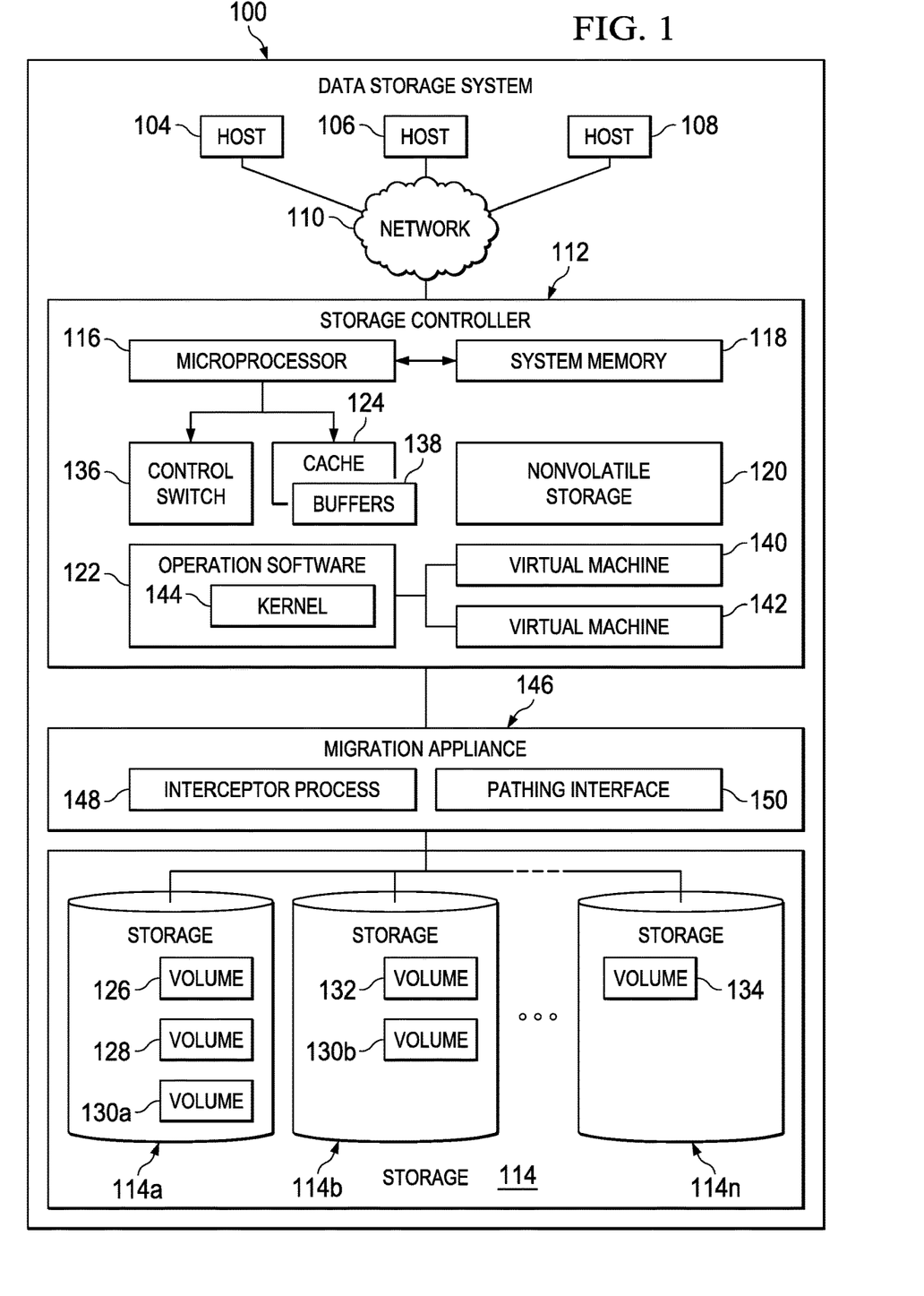
FIG. 1 is an exemplary block diagram of a hardware structure of a data storage system in a computer system depicted according to an illustrative embodiment.

With reference now to FIG. 1, an exemplary block diagram of a hardware structure of a data storage system 100 in a computer system is depicted according to an illustrative embodiment. Data storage system 100 is a network of computers, data processing systems, and other devices in which the illustrative embodiments may be implemented. In one embodiment, by way of example only, a data storage system 100 may be implemented as IBM® System Storage™ DS8000™.

Hosts 104, 106, and 108 may be one or more physical devices, logical devices or virtual devices to accomplish the purposes of the present invention in the data storage system 100. Hosts 104, 106, and 108 act as a central processing unit for performing data processing as part of a data storage system 100. In one embodiment, the hosts 104, 106, and 108 and the storage controller 112 are connected across network 110 through a network adaptor as an interface i.e., via a switch called "fabric."

Network 110 is the medium used to provide communications links between the computers, data processing systems, and other devices connected together within data storage system 100. Network 110 may include connections, such as, for example, wire communication links, wireless communication links, and fiber optic cables. Network 110 may be a fibre channel fabric, a fibre channel point to point link, a fibre channel over Ethernet fabric or point to point link, a FICON or ESCON I/O interface, any other I/o interface type, a wireless network, a wired network, a LAN, a WAN, heterogeneous, homogeneous, public (i.e. the Internet), private, or any combination thereof. The hosts, 104, 106, and 108 may be local or distributed among one or more locations and may be equipped with any type of fabric (or fabric channel) (not shown in FIG. 1) or network adapter to the storage controller 112, such as fibre channel, FICON, ESCON, Ethernet, fiber optic, wireless, or coaxial adapters. Data storage system 100 is accordingly equipped with a suitable fabric (not shown in FIG. 1) or network adapter to communicate. Data storage system 100 is depicted in FIG. 1 comprising storage controller 112 and storage 114.

To facilitate a clearer understanding of the methods described herein, storage controller 112 is shown in FIG. 1 as a single processing unit, including a microprocessor 116, system memory 118 and nonvolatile storage ("NVS") 120, which will be described in more detail below. It is noted that in some embodiments, storage controller 112 is comprised of multiple processing units, each with their own processor complex and system memory, and interconnected by a dedicated network within data storage system 100. Storage 114 may be comprised of one or more storage devices, such as storage arrays, which are connected to storage controller 112 by a storage network.

In some embodiments, the devices included in storage 114 may be connected in a loop architecture. Storage controller 112 manages storage 114 and facilitates the processing of write and read requests intended for storage 114. The system memory 118 of storage controller 112 stores program instructions and data, which the microprocessor 116 may access for executing functions and method steps of the present invention for executing and managing storage 114 as described herein. In one embodiment, system memory 118 includes, is in association with, or is in communication with the operation software 122 for performing methods and operations described herein. As shown in FIG. 1, system memory 118 may also include or be in communication with a cache 124 for storage 114, also referred to herein as a "cache memory", for buffering "write data" and "read data", which respectively refer to write/read requests and their associated data. In one embodiment, cache 124 is allocated in a device external to system memory 118, yet remains accessible by microprocessor 116 and may serve to provide additional security against data loss, in addition to carrying out the operations as described in herein.

In some embodiments, cache 124 is implemented with a volatile memory and nonvolatile memory and coupled to microprocessor 116 via a local bus (not shown in FIG. 1) for enhanced performance of data storage system 100. NVS 120 included in storage controller 112 is accessible by microprocessor 116 and serves to provide additional support for operations and execution of the present invention as described in other figures. NVS 120 may also be referred to as a "persistent" cache, or "cache memory", and is implemented with nonvolatile memory that may or may not utilize external power to retain data stored therein. NVS 120 may be stored in and with the cache 124 for any purposes suited to accomplish the objectives of the present invention. In some embodiments, a backup power source (not shown in FIG. 1), such as a battery, supplies NVS 120 with sufficient power to retain the data stored therein in case of power loss to data storage system 100. In certain embodiments, the capacity of NVS 120 is less than or equal to the total capacity of cache 124.

Storage 114 may be physically comprised of one or more storage devices, such as storage arrays. A storage array is a logical grouping of individual storage devices, such as a hard disk. In certain embodiments, storage 114 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 1 may include a logical volume, or simply "volume," may have different kinds of allocations. Storage 114a, 114b and 114n are shown as ranks in data storage system 100, and are referred to herein as rank 114a, 114b and 114n. Ranks may be local to data storage system 100, or may be located at a physically remote location. In other words, a local storage controller may connect with a remote storage controller and manage storage at the remote location. Rank 114a is shown configured with two entire volumes, 126 and 128, as well as one partial volume 130a. Rank 114b is shown configured with one entire volume, 132 and with another partial volume 130b. Thus volume 130 is allocated across ranks 114a and 114b. Rank 114n is shown as being fully allocated to volume 134—that is, rank 114n refers to the entire physical storage for volume 134. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

Storage controller 112 includes control switch 136 for controlling the fiber channel protocol to the hosts 104, 106, 108 as well as to or from storage 114, a microprocessor 116 for controlling all the storage controller 112, a NVS 120 for storing operation software 122 for controlling the operation of storage controller 112, data for control and each table described later, cache 124 for temporarily storing (buffering) data, and buffers 138 for assisting the cache 124 to read and write data. Multiple buffers 138 may be implemented with the present invention to assist with the operations as described herein.

The microprocessor 116 may control the system memory 118 to store command information from hosts 104, 106, 108 and information for identifying hosts 104, 106, 108. The control switch 136, the buffers 138, the cache 124, the operating software 122, the microprocessor 116, system memory 118, and NVS 120 are in communication with each other and may be separate or one individual component(s). Also, several, if not all of the components, such as the operation software 122 may be included with the system memory 118. Each of the components within the devices shown may be linked together and may be in communication with each other for purposes suited to the present invention.

In one illustrative example, operation software 122 is an operating system that is used to virtualize hardware resources. In this illustrative example, operation software 122 provides storage virtualization, logically abstracts the physical storage of storage 114 from virtual machines 140 and 142. Storage controller 112 uses virtual machines 140 and 142 to manage storage 114 and to facilitate the processing of write and read requests intended for storage 114. Virtual machines 140 and 142 can be assigned to a particular host 104, 106, or 108, storage 114a, 114b, or 114n, or volume 126, 128, 130, 132, or 134 when they are created.

Operation software 122 includes kernel 144. In this illustrative example, data storage system 100 includes migration appliance 146. Migration appliance 146 is a server appliance that is inserted into the data path. Migration appliance 146 drives block-level disk-to-disk migration, sometimes referred to as "off-board" migration, between source and target volumes, such as volumes 126, 128, 130, 132, and 134.

In this illustrative example, migration appliance 146 includes interceptor process 148. When migration appliance 146 is inserted between a selected port of storage controller 112 and a selected target port of storage 114, interceptor process 148 determines the 64-bit identifier assigned to the selected target port of storage 114, and determines the 64-bit identifier of each initiator port of host 104, 106, 108 that is zoned to the selected target port storage 114. Interceptor process 148 identifies all storage volumes 126, 128, 130, 132, and 134, in storage 114 that are assigned to each respective host 104, 106, and 108.

In this illustrative example, migration appliance 146 includes pathing interface 150. Pathing interface 150 is a hardware independent interface that can be replicated to other operating systems, such as operation software 122, or into a stand-alone appliance, such as migration appliance 146. Pathing interface 150 supports storage 114 and provides path selection algorithms to access storage 114. Pathing interface 150 associates a set of physical paths with a specific volume 126, 128, 130, 132, 134. It utilizes the construct of the Pluggable Storage Architecture (PSA) device filter framework.

In this illustrative example, pathing interface 150 can be utilized to take the "spoof" an identification of the storage 114 from migration appliance 146. Pathing interface 150 communicates with storage 114, as well as migration appliance 146, to transfer the start and end blocks of the data to be migrated over the logical units. Pathing interface 150 therefore enables long-distance replication based on requirements of the systems for images.

Because pathing interface 150 is hardware independent, pathing interface 150 extends the ability of interceptor process 148 of migration appliance 146 to communicate with kernel 144. Pathing interface 150 enables kernel 144 to perform off-board data migration tooling across disparate systems, migrating data at the image level.

The one illustrative example, pathing interface 150 isolates a set of application programming interfaces (APIs) for discovery, maintenance and removal of physical paths to storage 114. In this illustrative example, pathing interface 150 is made hardware independent by isolating the set of APIs inside a container, such as a Docker container. Containers include the application and all of its dependencies, but share the kernel with other containers, running as isolated processes in user space on the host operating system. Docker containers are not tied to any specific infrastructure: they run on any computer, on any infrastructure, and in any cloud. By isolating the set of APIs and replicating it as an image in a container, pathing interface 150 becomes hardware-independent and able to run across many types of systems.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). SaaS is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 2:
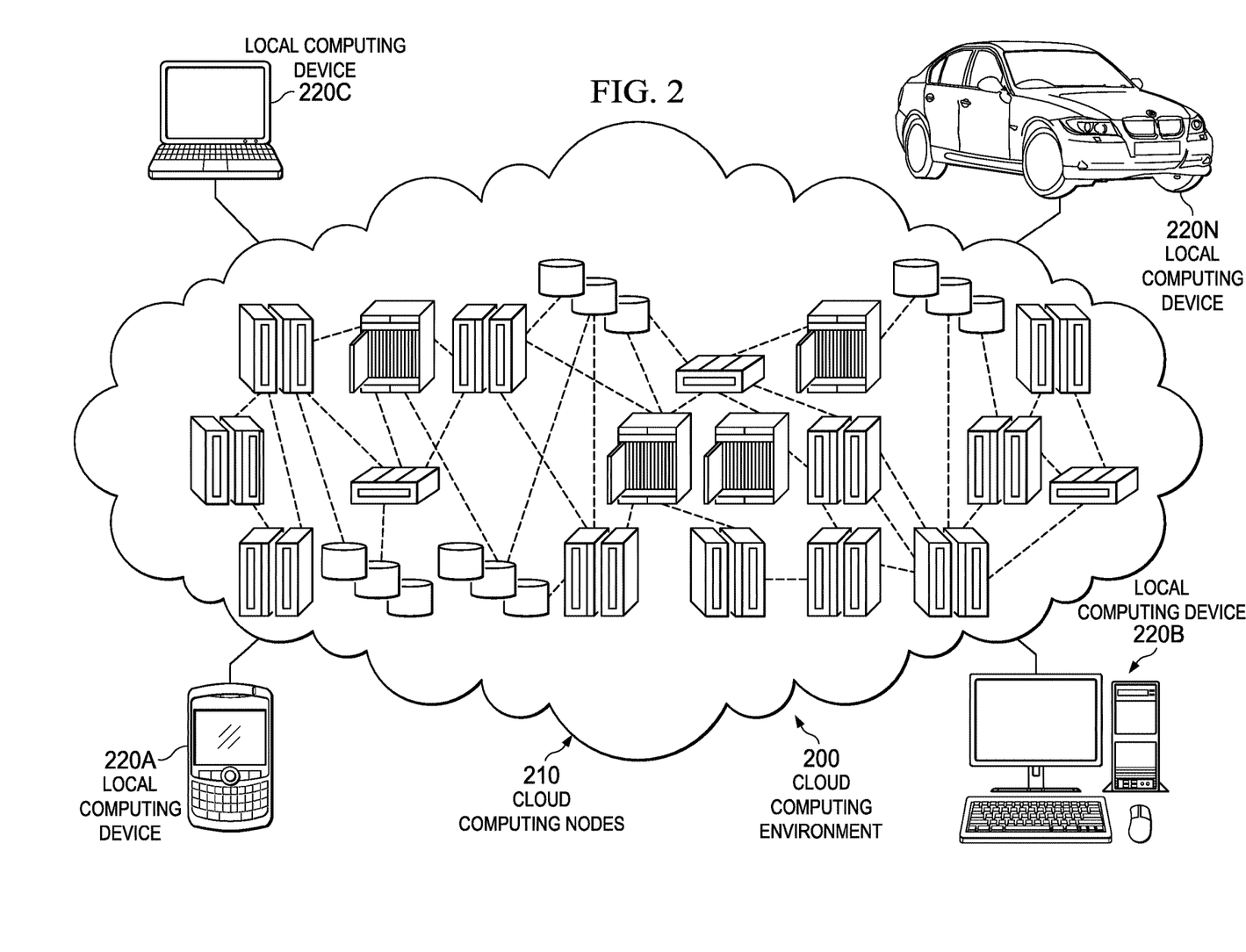
FIG. 2 is a diagram illustrating a cloud computing environment in which illustrative embodiments may be implemented.

With reference now to FIG. 2, a diagram illustrating a cloud computing environment is depicted in which illustrative embodiments may be implemented. In this illustrative example, cloud computing environment 200 includes a set of one or more cloud computing nodes 210 with which local computing devices used by cloud consumers, such as, for example, personal digital assistant or a smart phone 220A, desktop computer 220B, laptop computer 220C, and/or automobile computer system 220N, may communicate. Cloud computing nodes 210 may be, for example, host 104, 106, and 108 in FIG. 1.

Cloud computing nodes 210 may communicate with one another and may be grouped physically or virtually into one or more networks, such as private, community, public, or hybrid clouds as described hereinabove, or a combination thereof. This allows cloud computing environment 200 to offer infrastructure, platforms, and/or software as services for which a cloud consumer does not need to maintain resources on a local computing device, such as local computing devices 220A-220N. It is understood that the types of local computing devices 220A-220N are intended to be illustrative only and that cloud computing nodes 210 and cloud computing environment 200 can communicate with any type of computerized device over any type of network and/or network addressable connection using a web browser, for example.

Figure 3:
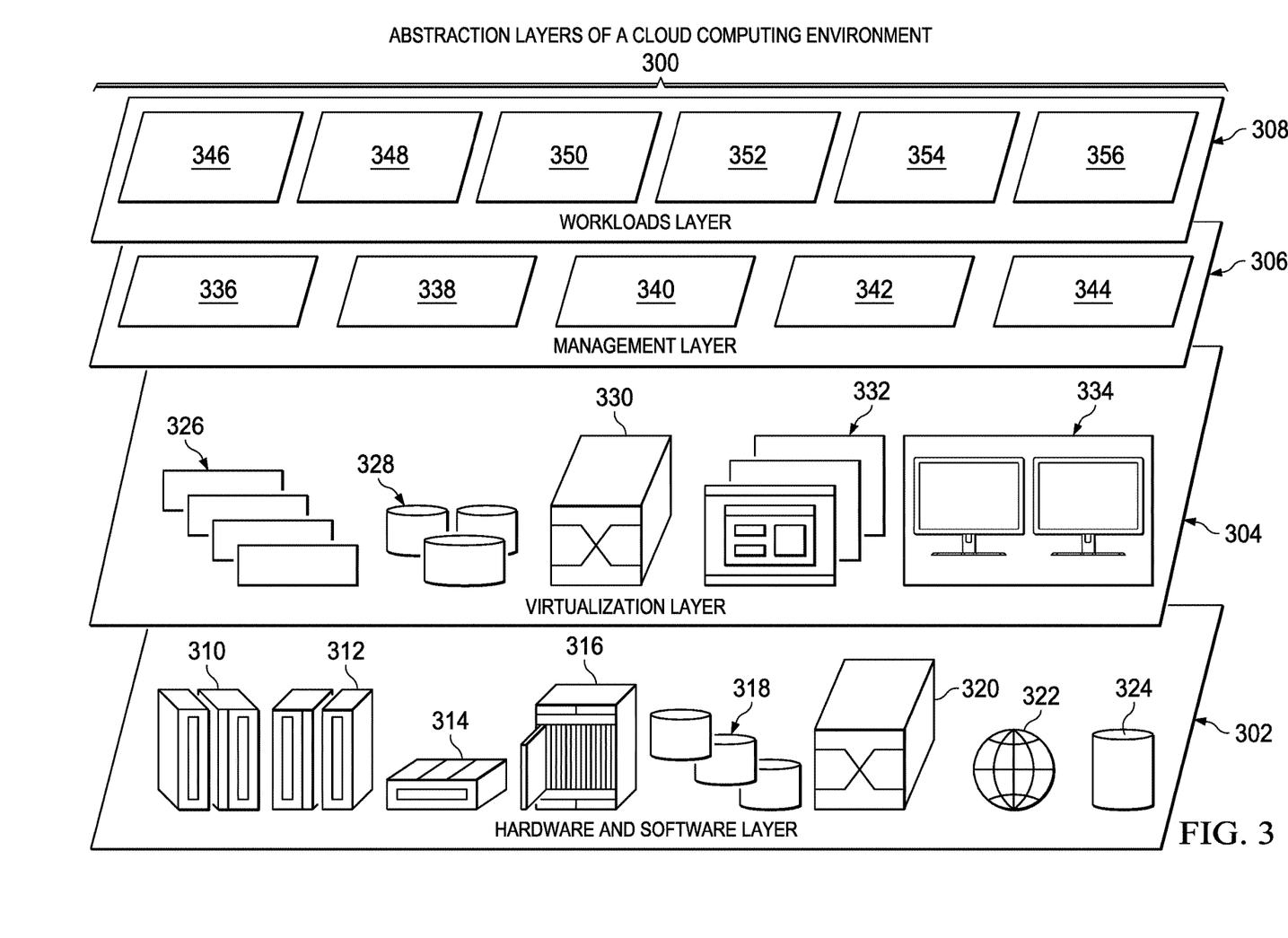
FIG. 3 is a diagram illustrating abstraction model layers depicted in accordance with an illustrative embodiment.

With reference now to FIG. 3, a diagram illustrating abstraction model layers is depicted in accordance with an illustrative embodiment. The set of functional abstraction layers shown in this illustrative example may be provided by a cloud computing environment, such as cloud computing environment 200 in FIG. 2. It should be understood in advance that the components, layers, and functions shown in FIG. 3 are intended to be illustrative only and embodiments of the invention are not limited thereto. As depicted, the following layers and corresponding functions are provided.

Abstraction layers of a cloud computing environment 300 includes hardware and software layer 302, virtualization layer 304, management layer 306, and workloads layer 308. Hardware and software layer 302 includes the hardware and software components of the cloud computing environment. The hardware components may include, for example, mainframes 310, RISC (Reduced Instruction Set Computer) architecture-based servers 312, servers 314, blade servers 316, storage devices 318, and networks and networking components 320. In some illustrative embodiments, software components may include, for example, network application server software 322 and database software 324.

Virtualization layer 304 provides an abstraction layer from which the following examples of virtual entities may be provided: virtual servers 326; virtual storage 328; virtual networks 330, including virtual private networks; virtual applications and operating systems 332; and virtual clients 334.

In one example, management layer 306 may provide the functions described below. Resource provisioning 336 provides dynamic procurement of computing resources and other resources, which are utilized to perform tasks within the cloud computing environment. Metering and pricing 338 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 340 provides access to the cloud computing environment for consumers and system administrators. Service level management 342 provides cloud computing resource allocation and management such that required service levels are met. Service level agreement (SLA) planning and fulfillment 344 provides pre-arrangement for, and procurement of, cloud computing resources for which a future requirement is anticipated in accordance with an SLA.

Workloads layer 308 provides examples of functionality for which the cloud computing environment may be utilized. Example workloads and functions, which may be provided by workload layer 308, may include mapping and navigation 346, software development and lifecycle management 348, virtual classroom education delivery 350, data analytics processing 352, transaction processing 354, and breaking dependence between service containers processing 356.

Figure 4:
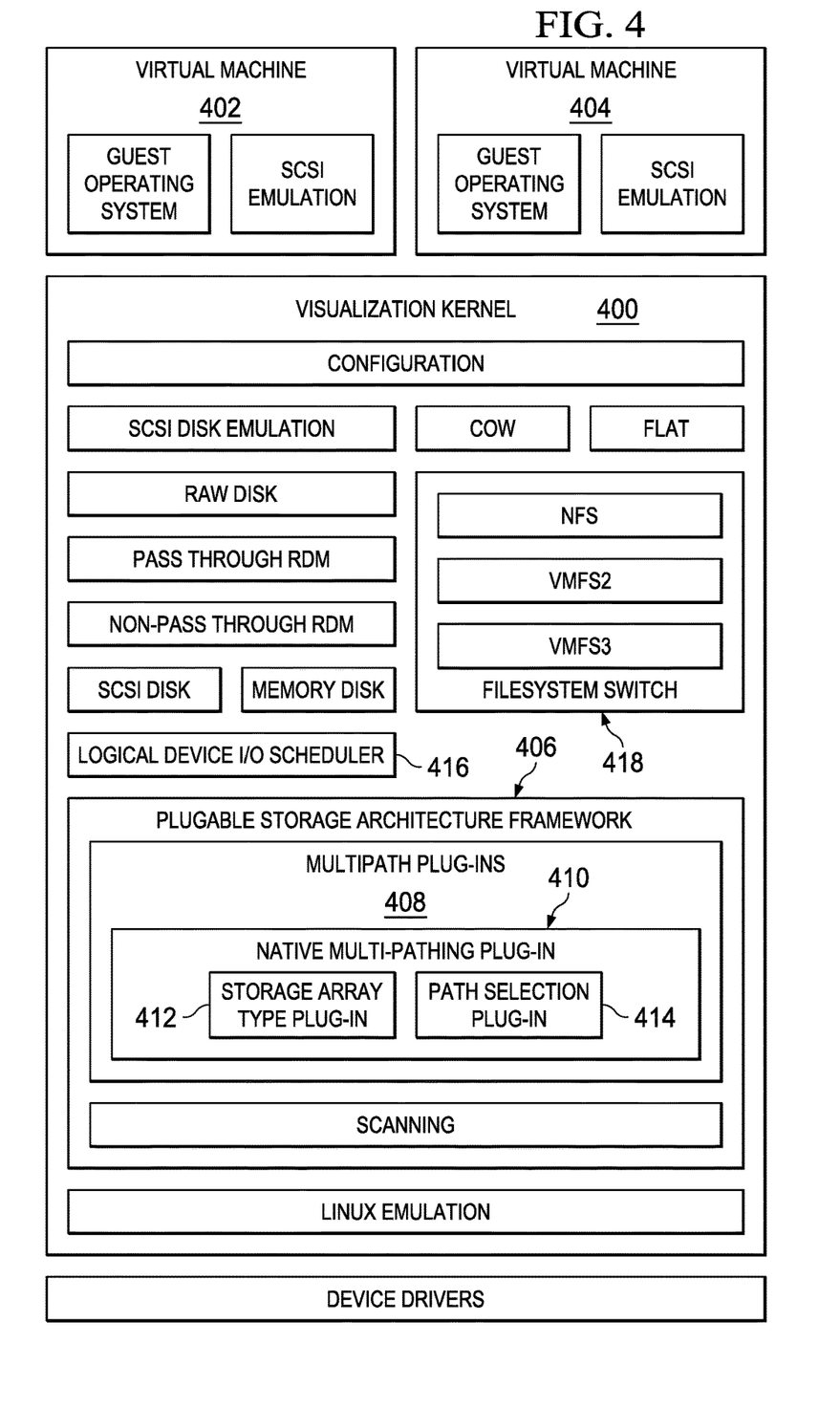
FIG. 4 is a block diagram for a virtualization kernel depicted according to the prior art.

Referring now to FIG. 4, a block diagram for a virtualization kernel is depicted according to the prior art. Virtualization kernel 400 is an example of kernel 144, shown in block form in FIG. 1. As depicted, virtualization kernel 400 provides basic operating system services needed to support virtual machines 402 and 404. Virtual machines 402 and 404 are examples of virtual machines 140 and 142, shown in block form in FIG. 1.

As depicted, virtualization kernel 400 includes pluggable storage architecture framework 406. Pluggable storage architecture framework 406 is a set of APIs that allows code to be inserted directly into the storage I/O path. Pluggable storage architecture framework 406 allows virtualization kernel 400 to implement hardware specific load balancing techniques and fail-over mechanisms for a particular storage array, such as one of storage 114a, 114b, and 114n, shown in block form in FIG. 1.

Pluggable storage architecture framework 406 is responsible for loading and unloading the multipath plug-ins 408. Pluggable storage architecture framework 406 handles physical path discovery and removal (via scanning) As pluggable storage architecture framework 406 discovers available storage paths, it determines which of multipath plug-ins 408 should be given ownership of that path. Pluggable storage architecture framework 406 routes I/O requests for a specific logical device to the appropriate one of multipath plug-ins 408. Pluggable storage architecture framework 406 handles I/O queuing to the physical storage adapters and to the logical devices. Pluggable storage architecture framework 406 also implements logical device bandwidth sharing between Virtual Machines and provides logical device and physical path I/O statistics.

Once one of multipath plug-ins 408 is given ownership of a path, multipath plug-ins 408 is responsible for associating a set of physical paths with a logical storage device, or LUN. Multipath plug-ins 408 manage physical path claiming and un-claiming as well as the creating, registering, and de-registering of logical devices on the host. Multipath plug-ins 408 process I/O requests to logical devices by selecting an optimal physical path for the request (load balance) and perform actions necessary to handle failures and request retries (fail-over).

Multipath plug-ins 408 includes the Native Multipath Plug-in (NMP) 410. Native Multipath Plug-in (NMP) 410 is a default multipath plug-in. NMP 410 supports all compatible storage arrays and manages sub-plug-ins for handling multipathing and load balancing. The specific details of handling path fail-over for a given storage array are delegated to Storage Array Type Plug-in (SATP) 412. The specific details for determining which physical path is used to issue an I/O request (load balancing) to a storage device are handled by Path Selection Plug-in (PSP) 414.

Virtualization kernel 400 contains not only pluggable storage architecture framework 406, but also the Logical Device I/O Scheduler 416 and the filesystem switch 418. Logical Device I/O Scheduler 416 schedules block I/O to the logical storage devices for the VMs running in a hypervisor and, for example. Logical Device I/O Scheduler 416 enforces the fair sharing of logical storage devices between virtual machines. Filesystem switch 418 provides a set of standard interfaces for upper-layer applications to perform file I/O over a diverse set of file systems.

Among other modules in virtualization kernel 400, logical device I/O scheduler 416 and filesystem switch 418 are hardware dependent. Because logical device I/O scheduler 416 and filesystem switch 418 are hardware dependent, virtualization kernel 400, including pluggable storage architecture framework 406, also becomes hardware dependent. Because pluggable storage architecture framework 406 is hardware dependent, storage systems utilizing virtualization kernel 400 cannot perform off-board data migration across disparate systems at the image level.

Figure 5:
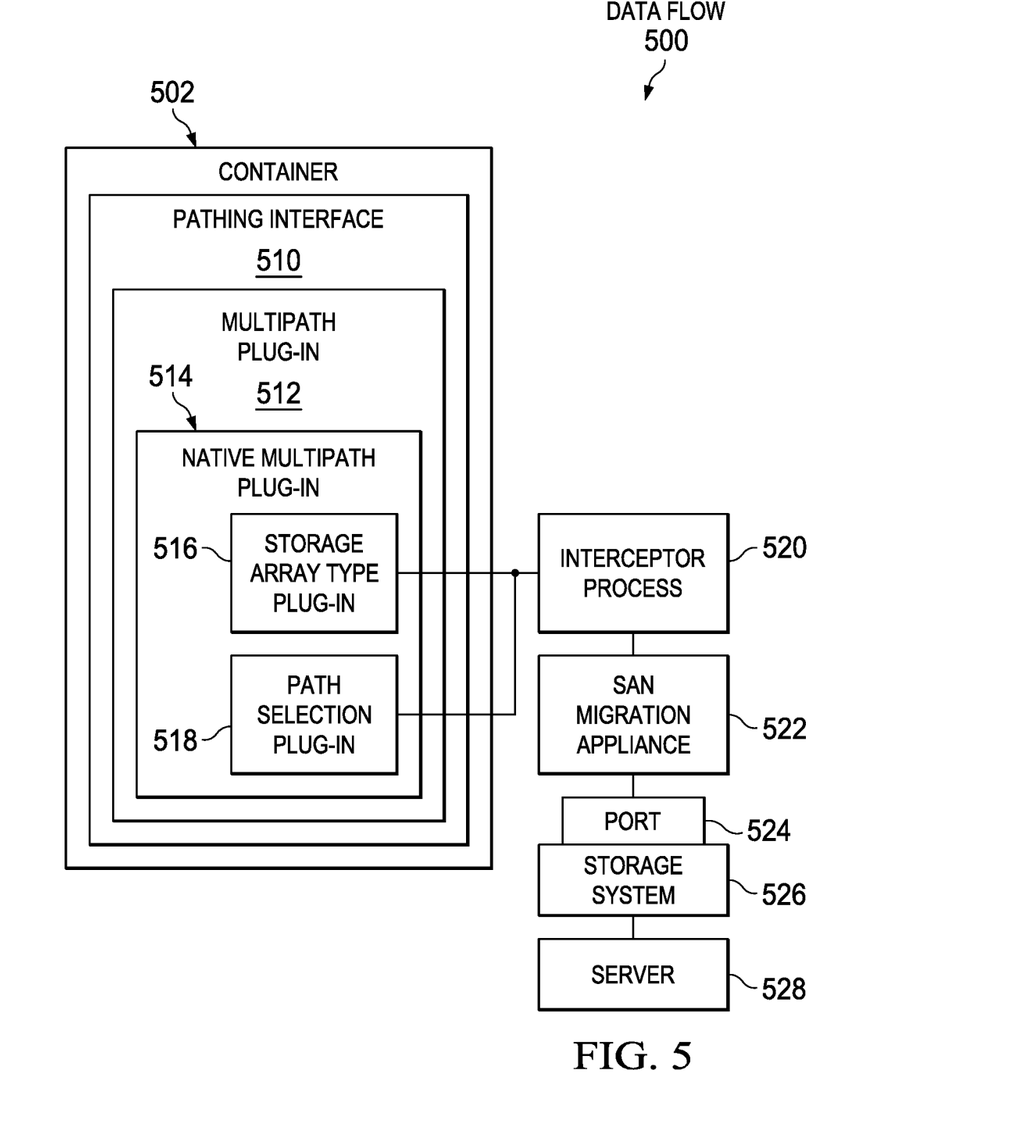
FIG. 5 is an illustration of a data flow diagram for a hardware independent pathing interface to provide path selection algorithms to access disparate storage depicted in accordance with an illustrative embodiment.

With reference now to FIG. 5, an illustration of a data flow diagram for a hardware independent pathing interface to provide path selection algorithms to access disparate storage is depicted in accordance with an illustrative embodiment. As depicted, data flow 500 is a data flow diagram for pathing interface 510. Pathing interface 510 is an example of pathing interface 150, shown in block form in FIG. 1.

In this illustrative example, pathing interface 510 is a replication of an image of pluggable storage architecture framework 406, shown in block form in FIG. 4, isolated from the remainder of virtualization kernel 400, shown in block form in FIG. 4. An image of a pathing interface, such as a Docker image, is utilized to launch container 502.

As depicted, pathing interface 510 includes multipath plug-in 512. Multipath plug-in 512 includes native multipath plug-in 514. Native Multipath plug-in 514 includes storage array type plug-in 516 and path selection plug-in 518. Multipath plug-in 512, native multipath plug-in 514, storage array type plug-in 516, and path selection plug-in 518 are replications of multipath plug-in 408, native multipath plug-in 410, storage array type plug-in 412, and path selection plug-in 414, respectively, isolated from the remainder of virtualization kernel 400, all shown in block form in FIG. 4.

In this illustrative example, pathing interface 510 is replicated inside container 502. Container 502 is a container, such as a Docker container. Container 502 is an operating system level virtualization where the kernel of the operating system allows for multiple isolated user space instances instead of just one. Container 502 does not require a separate operating system from that of its host. Container 502 utilizes the functionality and resource isolation of the kernel, such as virtualization kernel 400 of FIG. 4, along with separate namespaces to completely isolate an application's view of the operation system.

By isolating the pathing interface 510 from the remainder of virtualization kernel 400, shown in block form in FIG. 4, and replicating it as an image in container 502, pathing interface 510 becomes hardware-independent. Pathing interface 510 is therefore able to run across disparate types of systems.

In this illustrative example, pathing interface 510 attaches to interceptor process 520 of SAN migration appliance 522. Interceptor process 520 and SAN migration appliance 522 are examples of interceptor process 148 and migration appliance 146 respectively, both shown in block form in FIG. 1.

Interceptor process 520 can be utilized to emulate, or "spoof," the identification of the storage system 526 from SAN migration appliance 522. Interceptor process 520 determines the 64-bit identifier assigned to the selected target port-524 of storage system 526. Interceptor process 520 determines the 64-bit identifier of each initiator port of server 528 that is zoned to storage system 526. Interceptor process 148 identifies all storage volumes, such as volumes 126, 128, 130, 132, and 134 of FIG. 1, in storage system 526 that are assigned to server 528.

Because pathing interface 510 is hardware independent, pathing interface 510 extends the ability of migration appliance 522 to communicate with disparate storage systems kernel 144, shown in block form in FIG. 1. Pathing interface 510 enables kernel 144 to perform off-board data migration across disparate systems at the image level.

Figure 6:
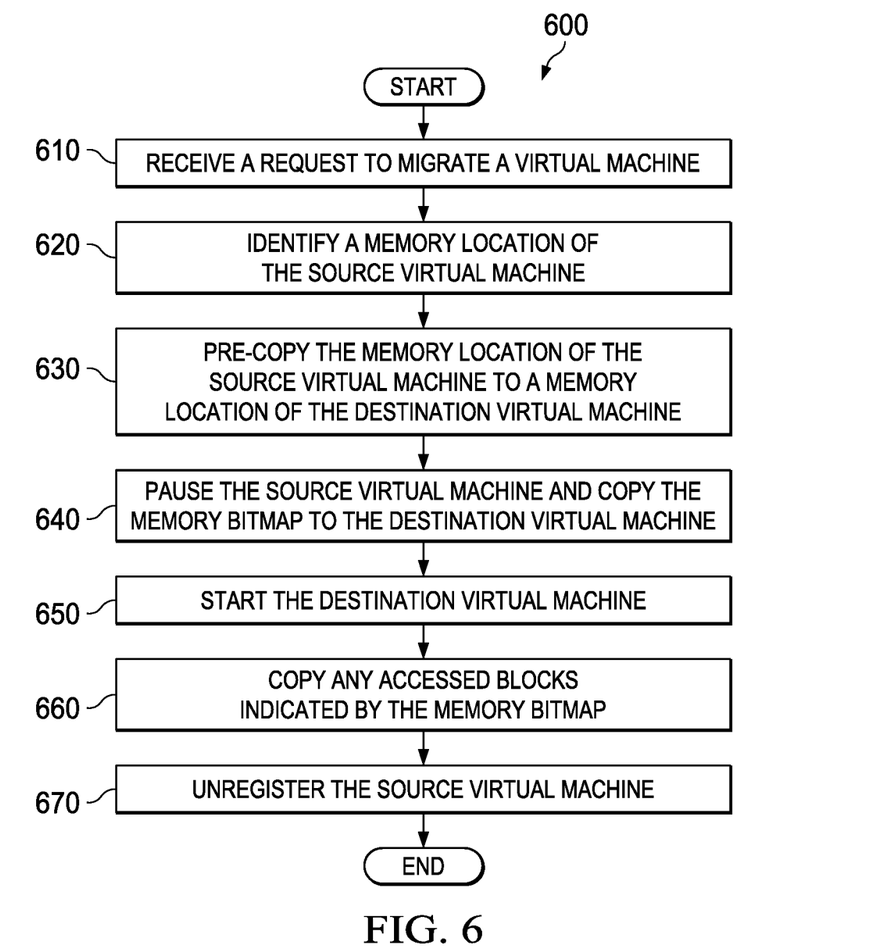
FIG. 6 is a flowchart of a process for off-board data migration in a computing storage environment depicted according to an illustrative embodiment.

With reference now to FIG. 6, a flowchart of a process for off-board data migration in a computing storage environment is depicted according to an illustrative embodiment. Process 600 of FIG. 6 is a software process, implemented in a storage controller, such as storage controller 112, shown in block form in FIG. 1.

Process 600 begins by receiving a request to migrate a virtual machine (step 610). The virtual machine can be, for example one of virtual machine 140, 142, shown in block form in FIG. 1. Request can be a storage copy a range of logical blocks from one location to another, either within a single LUN or from one LUN to another."

Process 600 identifies a memory location of the source virtual machine (step 620). In this illustrative example, the memory location is a range of logical blocks within a LUN. In this illustrative example, process 600 identifies the range of logical blocks from a hardware independent interface, such as pathing interface 510 shown in block form in FIG. 5.

Process 600 pre-copies the memory location of the source virtual machine to a memory location of the destination virtual machine using the generalized interface to access the range of logical blocks for both the source and destination virtual machines (step 630). Any ongoing changes to the source virtual machine can be written to a memory bitmap. The memory bitmap does not have contents of memory; instead it has addresses of that memory When the memory location of the source virtual machine has finished copying to the memory location of the destination virtual machine copied to destination host, the source virtual machine is paused, and the memory bitmap is copied to the destination virtual machine (step 640). The destination virtual machine is started (step 650). Any memory access to the memory location of the source virtual machine is directed to the memory location of the destination virtual machine.

Process 600 copies any accessed blocks indicated by the memory bitmap (step 660), and the source virtual machine is unregistered (step 670). The process terminates thereafter.

This invention solves the problem of migrating images via methods other than on-board migration by creating a generalized interface that talks to storage, as well as migration appliances, to transfer the start and end blocks of the data to be migrated over the LUNs. This generalized interface extends the capability of the API primitive to also include storage that is geographically separated and from unlike vendors. By isolating the generalized interface from other portions of the virtualization kernel and replicating it as a Docker image, the generalized interface is made hardware-independent and able to run across many types of systems.

Thus, the hardware-independent generalized interface of the present invention enables long-distance replication based on requirements of the systems for images, rather than entire storage arrays as required by other off-board migration techniques. By abstracting the interface into a container instance, long-distance replication becomes available to any image in a datacenter that utilizes fixed block data.

Figure 7:
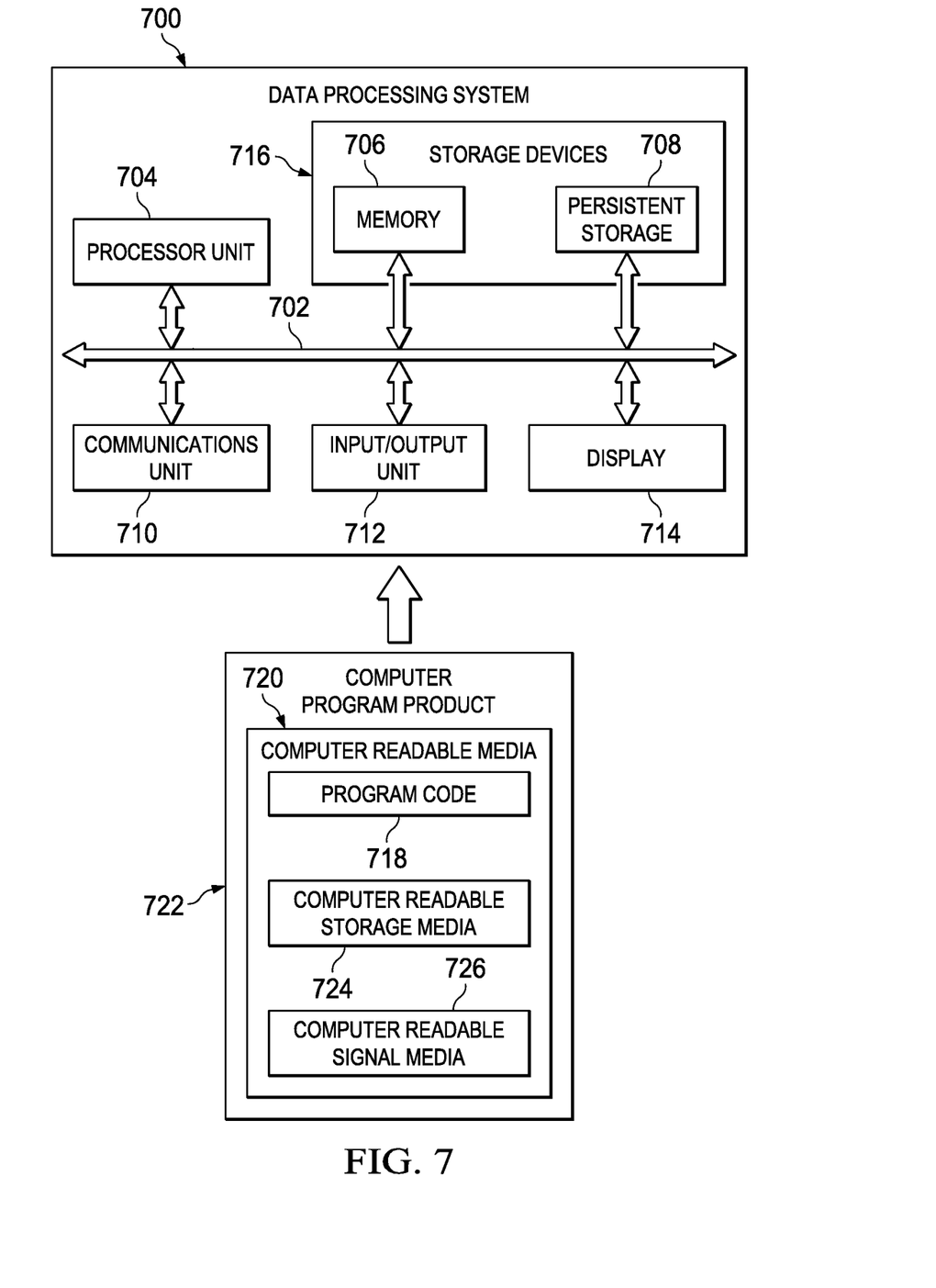
FIG. 7 is a diagram of a data processing system is depicted in accordance with an illustrative embodiment.

With reference now to FIG. 7, a diagram of a data processing system is depicted in accordance with an illustrative embodiment. Data processing system 700 is an example of a computer, such as hosts 104, 106, 108, storage controller 112, and migration appliance 146 in FIG. 1, in which computer readable program code or instructions implementing processes of illustrative embodiments may be located. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

Memory 706 and persistent storage 708 are examples of storage devices 716. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via a network, such as network 102 in FIG. 1. Communications unit 710 may provide communications through the use of both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, a keyboard, a mouse, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented instructions, which may be located in a memory, such as memory 706. These program instructions are referred to as program code, computer usable program code, or computer readable program code that may be read and run by a processor in processor unit 704. The program instructions, in the different embodiments, may be embodied on different physical computer readable storage devices, such as memory 706 or persistent storage 708.

Program code 718 is located in a functional form on computer readable media 720 that is selectively removable and may be loaded onto or transferred to data processing system 700 for running by processor unit 704. Program code 718 and computer readable media 720 form computer program products 722. In one example, computer readable media 720 may be computer readable storage media 724 or computer readable signal media 726. Computer readable storage media 724 may include, for example, an optical or magnetic disc that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 718 may be downloaded over a network to persistent storage 708 from another device or data processing system through computer readable signal media 726 for use within data processing system 700. For instance, program code stored in a computer readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer readable storage device in data processing system 700 is any hardware apparatus that may store data. Memory 706, persistent storage 708, and computer readable storage media 744 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
performing an off-board migration of a virtual machine from a source location to a destination location by:
responsive to receiving a request to migrate the virtual machine, identifying a first memory location of a first instance of the virtual machine corresponding to a first volume of a first storage at the source location;
accessing a range of logical blocks for both the source location and the destination location using a generalized pathing interface, wherein the generalized pathing interface:
communicates with the first storage;
utilizes a Pluggable Storage Architecture (PSA) device filter framework; and
isolates a set of application programming interfaces (APIs) in a container, wherein the set of APIs is used for discovery, maintenance, and removal of physical paths to the first storage;
copying virtual machine image data residing at the first memory location of the first volume of the first storage to a second memory location at the destination location of a second volume of a second storage;
starting a second instance of the virtual machine at the destination location; and
stopping the first instance of the virtual machine at the source location, wherein the generalized pathing interface is a hardware independent interface comprising the set of application programming interfaces (APIs) for managing physical paths to storage, wherein the set of application programming interfaces is isolated from hardware dependent components of a virtualization kernel, and wherein the hardware dependent components of the virtualization kernel comprise a logical device I/O scheduler and filesystem switch.

2. The method of claim 1, wherein the container is a Docker container.

3. The method of claim 1, wherein the generalized pathing interface is attached to a packet interceptor process of a storage area network migration appliance.

4. The method of claim 1, wherein the virtual machine at the source location and the virtual machine at the destination location are implemented in disparate storage systems.

5. The method of claim 4 wherein copying the virtual machine image data residing at the first memory location to the second memory location further comprises off-board data migration across the disparate storage systems at an image level.

6. The method of claim 1, wherein:
the first volume and the second volume are different volumes; and
the first storage and the second storage are different storages.

7. The method of claim 6, wherein the first storage and the second storage are different storages of a same storage array.

8. The method of claim 1, wherein:
the first volume and the second volume are different volumes; and
the first storage and the second storage are a same storage.

9. A data storage system comprising:
a generalized pathing interface for managing physical paths to a storage array; and
a processor, wherein the processor is configured to:
responsive to receiving a request to migrate a virtual machine image, identify a memory location of a source virtual machine;
access a range of logical blocks for both the source virtual machine and a destination virtual machine using the generalized pathing interface, wherein the generalized pathing interface:
comprises a migration appliance in communication with a first storage of the storage array;
takes a spoof of an identification of the first storage from the migration appliance;
isolates a set of application programming interfaces (APIs) in a container, wherein the set of APIs is used for discovery, maintenance, and removal of physical paths to the first storage using the spoof in; and
is configured to migrate virtual machine image data by transferring a start block and an end block of the virtual machine image data over logical units;
copy the virtual machine image data residing at the memory location of the source virtual machine located on the first storage to a memory location of the destination virtual machine located on a second storage of the storage array;
start the destination virtual machine; and
stop the source virtual machine, wherein the generalized pathing interface is a hardware independent interface comprising the set of application programming interfaces (APIs) for managing physical paths to storage, wherein the set of application programming interfaces is isolated from hardware dependent components of a virtualization kernel, and wherein the hardware dependent components of the virtualization kernel comprise a logical device I/O scheduler and filesystem switch.

10. The data storage system of claim 9, wherein the container is a Docker container.

11. The data storage system of claim 9, wherein the generalized pathing interface is attached to a packet interceptor process of a storage area network migration appliance.

12. The data storage system of claim 9, wherein the source virtual machine and the destination virtual machine are implemented in disparate storage systems.

13. The data storage system of claim 12, wherein copying the memory location of the source virtual machine to the memory location of the destination virtual machine further comprises off-board data migration across the disparate storage systems at an image level.

14. A computer program product comprising:
a computer-readable medium including instructions for off-board data migration, wherein the computer readable storage medium is not a transitory signal per se, the instructions comprising:
first program code for identifying a memory location of a source virtual machine in response to receiving a request to migrate a virtual machine image;
second program code for accessing a range of logical blocks for both the source virtual machine and a destination virtual machine using a generalized pathing interface, wherein the generalized pathing interface:
utilizes a Pluggable Storage Architecture (PSA) device filter framework;
isolates a set of application programming interfaces (APIs) in a container, wherein the set of APIs is used for discovery, maintenance, and removal of physical paths to the first storage using the spoof in;
is hardware independent;
enables off-board data migration tooling across disparate systems; and
migrates data at an image level;
third program code for copying data residing at the memory location of the source virtual machine to a memory location of the destination virtual machine;
fourth program code for starting the destination virtual machine on a first virtualization kernel; and
fifth program code for stopping the source virtual machine on a second virtualization kernel, wherein the second virtualization kernel and the first virtualization kernel are a same virtualization kernel, wherein the generalized pathing interface is a hardware independent interface comprising the set of application programming interfaces (APIs) for managing physical paths to storage, wherein the set of application programming interfaces is isolated from hardware dependent-components of the same virtualization kernel, and wherein the hardware dependent components of the same virtualization kernel comprise a logical device I/O scheduler and filesystem switch.

15. The computer program product of claim 14, wherein:
the generalized pathing interface is attached to a packet interceptor process of a storage area network migration appliance;
the source virtual machine and the destination virtual machine are implemented in disparate storage systems; and
the third program code comprises sixth program code for off-board data migration across the disparate storage systems at an image level.

* * * * *